(12) United States Patent
Gustafson

(10) Patent No.: US 7,108,475 B1
(45) Date of Patent: Sep. 19, 2006

(54) THREE-POINT HITCH FACEPLATE

(76) Inventor: John Gustafson, P.O. Box 139, Fall Creek, WI (US) 54742

( * ) Notice: Subject to any disclaimer, the term of this patent is extended or adjusted under 35 U.S.C. 154(b) by 0 days.

(21) Appl. No.: 10/440,649

(22) Filed: May 19, 2003

Related U.S. Application Data

(60) Provisional application No. 60/437,076, filed on Dec. 30, 2002.

(51) Int. Cl.
*E02F 9/00* (2006.01)
(52) U.S. Cl. ............... 414/723; 37/468; 280/416.2
(58) Field of Classification Search ........ 414/680, 414/723, 703; 280/416.2; 37/468
See application file for complete search history.

(56) References Cited

U.S. PATENT DOCUMENTS

| 2,465,641 A | * | 3/1949 | Gardner ............... 280/407 |
| 3,688,847 A | | 9/1972 | Deeter |
| 3,847,415 A | | 11/1974 | Geisthoff et al. |
| 3,871,463 A | | 3/1975 | Geisthoff et al. |
| 4,488,850 A | | 12/1984 | Wernimont |
| 4,509,768 A | * | 4/1985 | Haug ............... 414/723 X |
| 4,558,881 A | | 12/1985 | Manteufel |
| 4,805,927 A | | 2/1989 | Stephenson et al. |
| 4,905,769 A | * | 3/1990 | Barnes et al. ........... 172/272 |
| 5,064,338 A | * | 11/1991 | Lawrence ........... 414/703 X |
| 5,098,252 A | | 3/1992 | Sheesley et al. |
| 5,178,511 A | * | 1/1993 | Wedin ................. 414/703 |
| 5,403,144 A | * | 4/1995 | Staben, Jr. ........... 414/723 X |
| 5,657,825 A | | 8/1997 | Englund |
| 5,690,182 A | * | 11/1997 | Ward ............... 280/416.2 X |
| 5,788,257 A | | 8/1998 | Meyerhofer |
| 5,950,735 A | | 9/1999 | Godbersen |
| 6,088,938 A | | 7/2000 | Logan |
| 6,386,569 B1 | | 5/2002 | Wick |
| 6,390,765 B1 | | 5/2002 | Dick |
| 6,481,948 B1 | | 11/2002 | Spears |

* cited by examiner

*Primary Examiner*—Donald W. Underwood
(74) *Attorney, Agent, or Firm*—Jacobson and Johnson

(57) ABSTRACT

A three-point hitch faceplate having a set of skid steer receiver attachment points to permit an all-purpose agricultural tractor to operably connect to skid steer attachments so that the agricultural tractor can utilize off-the-shelf skid steer attachments.

21 Claims, 14 Drawing Sheets

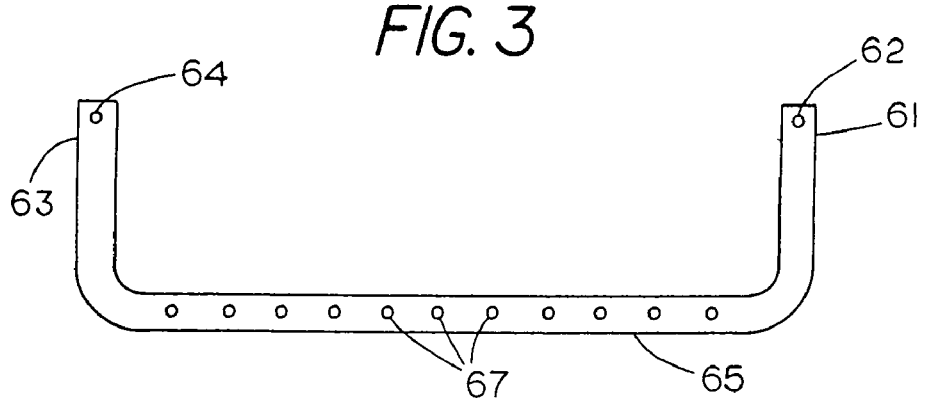
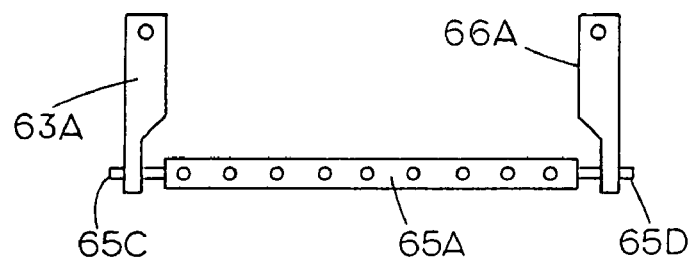
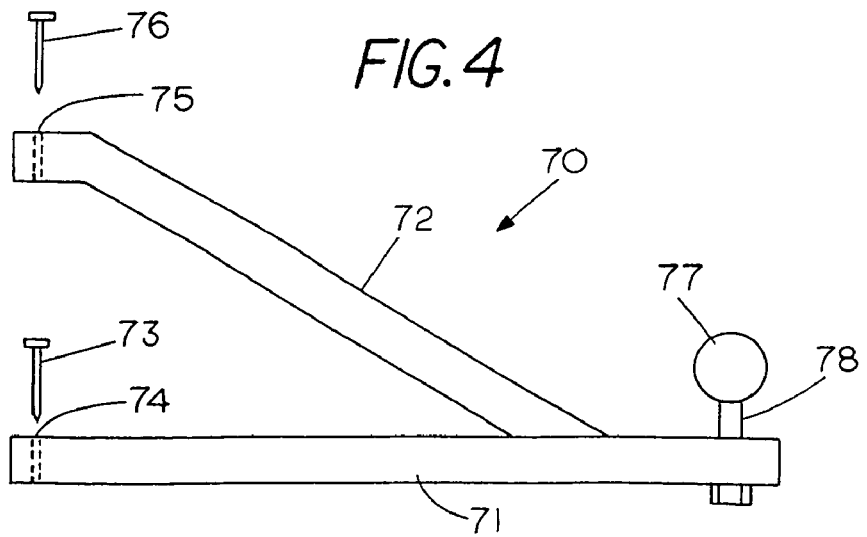

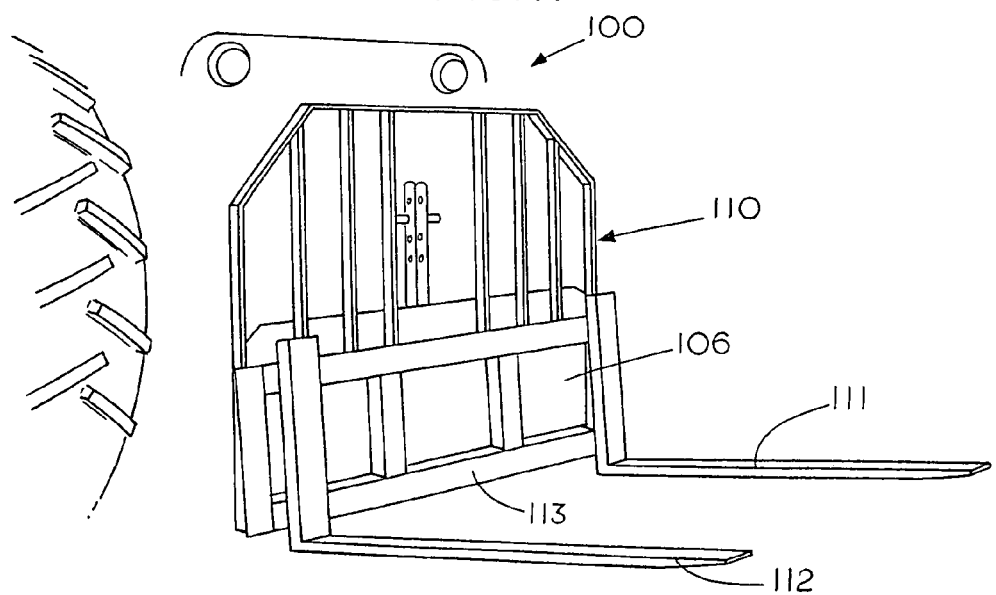
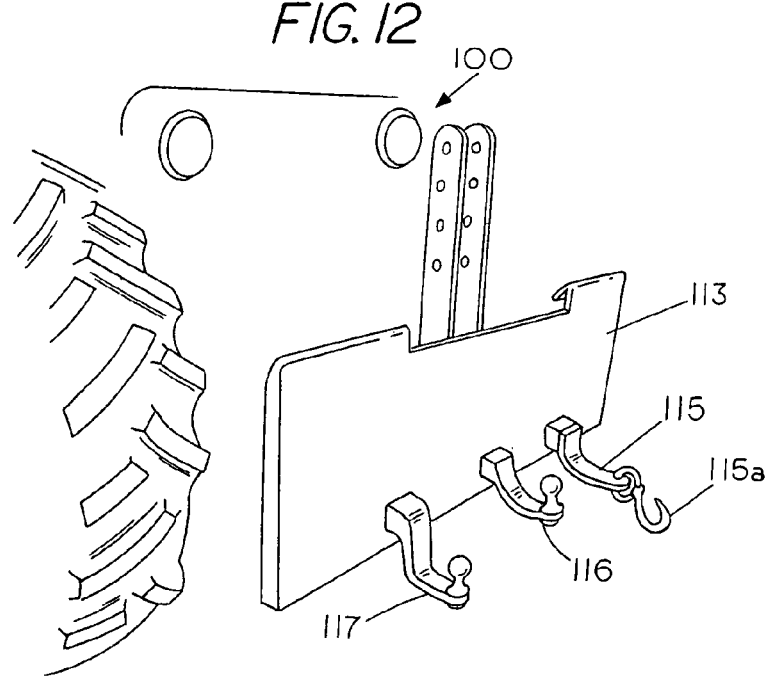

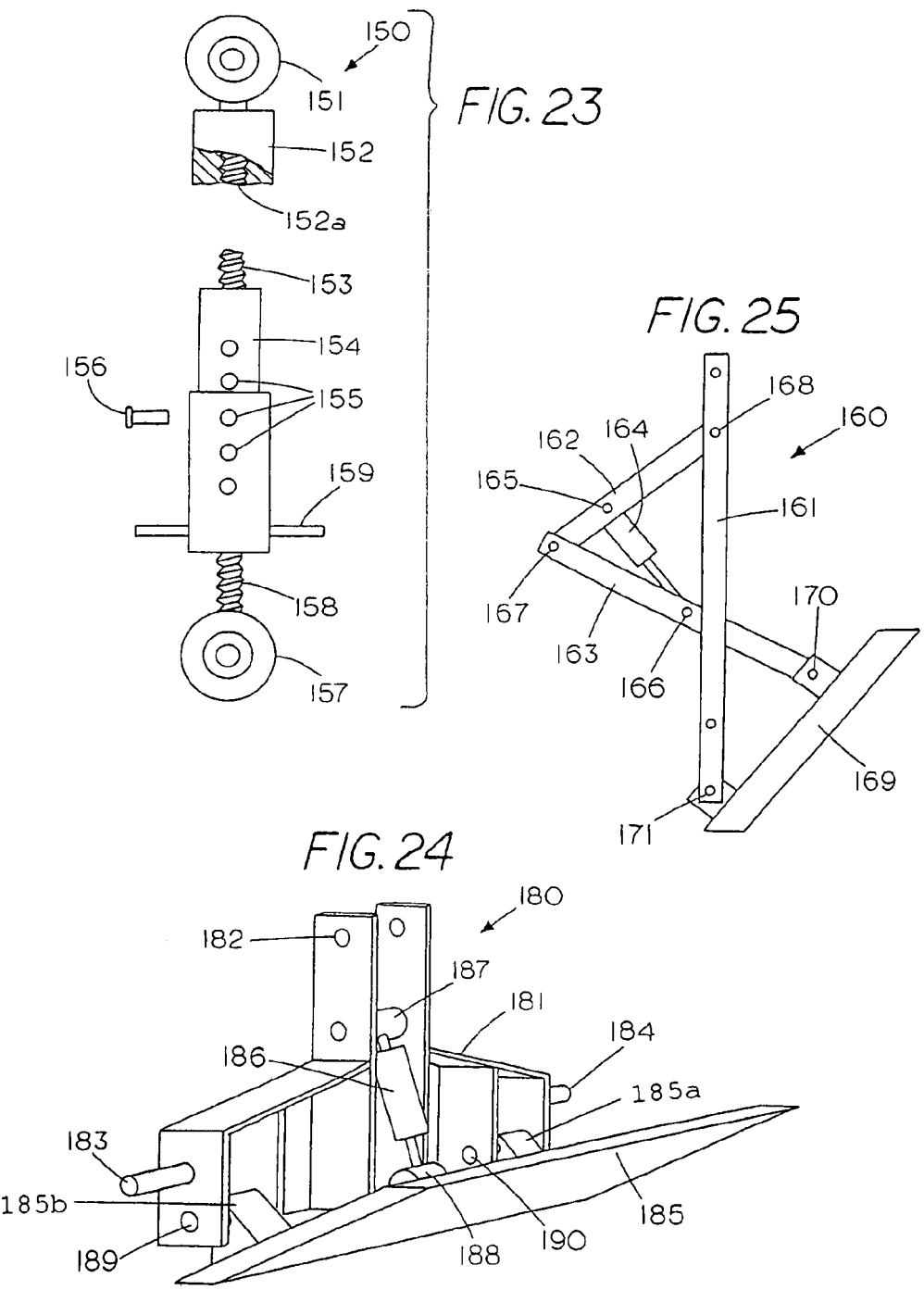

THREE-POINT HITCH FACEPLATE

CROSS REFERENCE TO RELATED APPLICATIONS

This application claims priority from my provisional application 60/437,076 filed Dec. 30, 2002 titled Three-point hitch faceplate.

FIELD OF THE INVENTION

This invention relates generally to apparatus to allow a user to use specialty equipment available for skid steer loaders on a conventional vehicle such as an agricultural tractor with a three-point hitch.

STATEMENT REGARDING FEDERALLY SPONSORED RESEARCH OR DEVELOPMENT

None

REFERENCE TO A MICROFICHE APPENDIX

None

BACKGROUND OF THE INVENTION

Skid steer machines are known and widely used for many tasks. The skid steer machines are compact and lack any steerable wheels. In contrast to machines that have steerable wheels the skid steer maneuvers by stopping or slowing the rotation of one set of side wheels while allowing the other set of side wheels to rotate. The skid steer machines are extremely popular for use in special operations. As a result, a number of different attachments have been created to allow the skid steer machine to perform different tasks. For example, in one application a bucket is attached to the front of the skid steer machine and in another application a blade and in still other applications forks can be attached to allow the skid steer machine to be used as a fork loader.

One of the disadvantages of the skid steer machines is that the skid steer machines are relatively expensive and the equipment used with the skid steer machines is specialized. Consequently, the use of skid steer machines and attachments to skid steer machines is limited to specific industries. Since some skid steer activities are of a one time usage there has developed a market for rental of attachments for skid steer loaders.

A common source of power on a farm is a tractor which has a rear three-point hitch for attachment of farm equipment thereto. Agricultural tractors are well known and can be used as a source of power for various agricultural equipment. The three-point hitch on the tractors are suitable for attaching farm equipment thereto. Unfortunately, the farm tractors are not suitable for use with skid steer attachments. From time to time an owner of an agricultural tractor may need to perform a specific task which could be performed with an available attachment for a skid steer loader. The present invention provides a three-point hitch faceplate that mounts to the three-point tractor mounts to enable an operator to engage and operate any of the skid steer attachments using the tractor as a source of power.

SUMMARY OF THE INVENTION

A three-point hitch faceplate having a set of skid steer receiver attachment points to permit an all-purpose agricultural tractor with a three-point hitch to operably connect to off-the-shelf skid steer attachments so that the agricultural tractor can utilize off-the-shelf skid steer attachments.

BRIEF DESCRIPTION OF THE DRAWINGS

FIG. 3 is a top view of a drawbar attachment for the three-point hitch faceplate of FIG. 1;

FIG. 3A shows an alternate embodiment of a hitch having a pivotable drawbar;

FIG. 4 is a trailer hitch attachment for the three-point hitch faceplate of FIG. 1;

FIG. 11 is a perspective showing a fork lift with lateral positionable arms secure to the three-point hitch faceplate;

FIG. 12 is a perspective showing a number of different hitch members mounted to the three-point hitch faceplate;

FIG. 23 is a partial section view of an extendible link;

FIG. 24 is a perspective view of an attachment for a three-point hitch which includes a hydraulic ram for tilting the faceplate;

FIG. 25 is a side view of an alternate embodiment of a tilting mechanism for the faceplate attachment of the present invention.

DESCRIPTION OF THE PREFERRED EMBODIMENT

Figure 1:
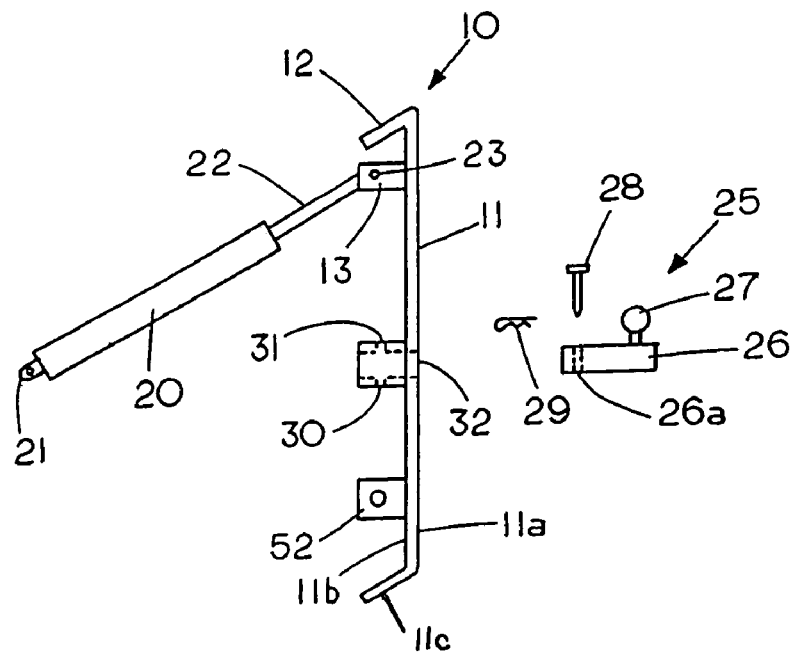
FIG. 1 is a side view of my three-point hitch faceplate.
Figure 5:
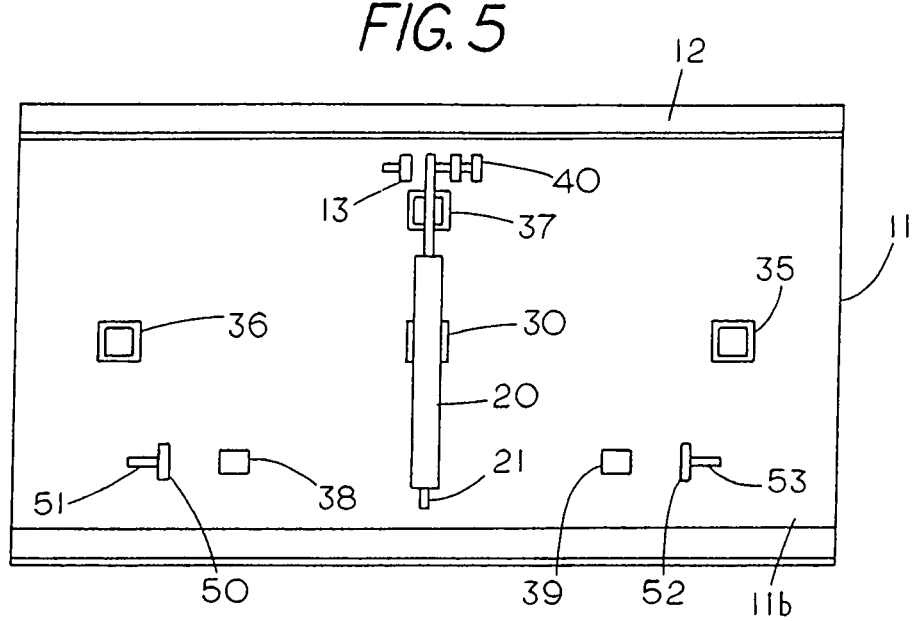
FIG. 5 is a rear view of the three-point hitch faceplate of FIG. 1.

FIG. 1 shows a side view of the three-point hitch faceplate 10 and FIG. 5 shows a rear view of the three-point hitch faceplate 10, which is made of metal. The three-point hitch faceplate 10 comprises a rigid rectangular shaped member 11 having a front face 11a, a rear face 11b and a rearward extending top lip 12 to form mating engagement with a conventional skid steer attachment and a bottom angled lip 11c that engages a locking mechanism to hold an attachment on the three-point hitch faceplate 10. Mounted on the rear face 11b of faceplate 11 is a first connecting member 52 and a second connecting member 50 with connecting members 52 and 50 laterally spaced from each other and secured to the back side 11b of rigid member 11. The first connecting member 52 is connectable to a first tractor mount (not shown) through a pin 53 and the second connecting member 50 is connectable to a second tractor mount (not shown) through a pin 51. A third connecting member 13 is secured to the back side 11b of rigid member 11 with the third connecting member spaced from a straight line connecting the first connecting member 50 and second connecting member 52 to thereby form a portion of a three-point engagement with the rigid plate 11.

In the present embodiment a two way hydraulic cylinder 20, which is extendible and contractable, has a first end 21 for connecting to third tractor mount and a second end 22, pivotally connected to the third connecting member 13 to thereby form an extendible link between the third tractor mount (not shown) and the third connecting member 13 to allow a user to position the rigid member 11 for attachment to a skid steer attachment.

The use of an extendible link, in this case a hydraulic cylinder, allows one to move the top lip 12 back and forth to enable one to engage the lip 12 with a skid steer attachment without having to move the tractor. Thus the hydraulic cylinder 20 allows one to provide additional motion to the conventional motion of a three-point hitch. As a result an operator can manipulate the three-point hitch faceplate 10 to enable one to pick up and engage skid steer attachment. A set of spaced apart openings 38 and 39 are positioned in member 11 so as to allow skid steer attachment links (not shown) to penetrate through the rigid member 11 so that the skid steer attachment can be locked on the faceplate 10 by extending a pin through the links. Although pin fasteners are shown, other means of locking the attachment to the three-point hitch faceplate can be used.

Figure 2:
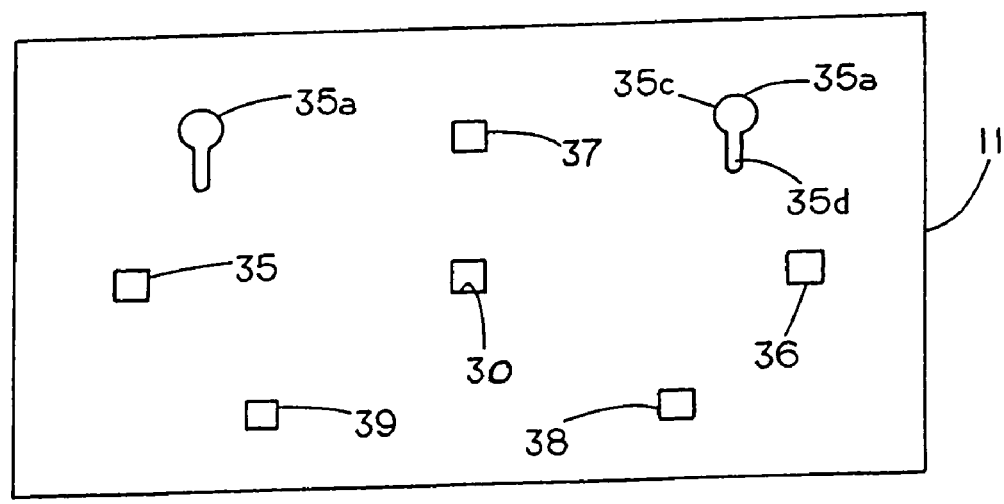
FIG. 2 is a front view of the three-point hitch faceplate of FIG. 1.

The embodiment shown in FIGS. 1, 2 and 5 allows one to use a conventional agricultural tractor with a three-point tractor mount to operate skid steer attachments.

While the present invention comprises a three-point hitch faceplate 11 to enable an operator to use skid steer attachments on a tractor with a three-point hitch it also allows an operator to use the three-point hitch faceplate 11 for securement of a trailer hitch or a drawbar.

FIG. 2 shows a front view of rigid member 11 having a first box member 30, a second box member 35, a third box member 36 and a fourth box member 37 which are secured to plate 11 through welding or the like. Each of the box members can receive a conventional ball hitch or receiver hitch, which can be temporarily secured thereto to enable the tractor to be used for towing.

FIG. 1 shows the ball hitch 25 includes a member 26 for mating insertion with any of the box members. Member 26 includes a through hole 26a that allows one to insert pin 28 there through and latch the pin with key 29. For example, member 26 is inserted into box member 30 and the holes 26a and 31 are aligned and the pin 28 is inserted thereto and latched with key 29 to maintain the trailer hitch 25 in position. The operator can now use ball 27 on the ball hitch 25 to move a towable vehicle from one location to another.

FIG. 3 shows an alternate towing attachment comprising a U-shaped drawbar 65 having a set of holes 67 for equipment mounting. Located at one end is a member 63 having an opening 64 and located at the other end is a member 61 having an opening 62. The members 61 and 63 are so spaced so that they can be engaged with box members 35 and 36 to thereby provide a quick mount horizontal drawbar on the unit.

While the drawbar 65 is shown as a quick connect unit the drawbar could be welded or bolted to a separate three-point hitch faceplate which would allow one to convert a conventional three-point hitch on an agricultural tractor to a drawbar hitch through the use of the three-point hitch faceplate.

FIG. 3A shows an alternate embodiment of a hitch having a pivotable drawbar 65A that is rotatably supported in link 63A by extension 65C and on the other end by extension 66A by extension 65D. In the embodiment shown in FIG. 3A the members 63A and 66A are attached to the three-point hitch faceplate.

FIG. 4 shows an alternate ball hitch 70 wherein the ball hitch 70 includes a brace member 72 having an end for engaging an upper box member such as box member 37 and a lower member having an end for engaging a lower box member such as box member 30. The use of pins 76 and 73 allows one to lock the ends of the members to their respective box members. Thus in this embodiment one can provide for a reinforced ball hitch to handle a greater torque load since the ball hitch 70 is supported on two positions.

A feature of the tow hitches shown in FIG. 3 and FIG. 4 is that they can be quickly attached to the three-point hitch faceplate 11 so an operator can perform different tasks without having to remove the three-point hitch faceplate. In addition, the three-point hitch of the tractor can be converted to a drawbar towing attachment or a ball towing attachment and still be operated through the three-point hitch.

Figure 6:
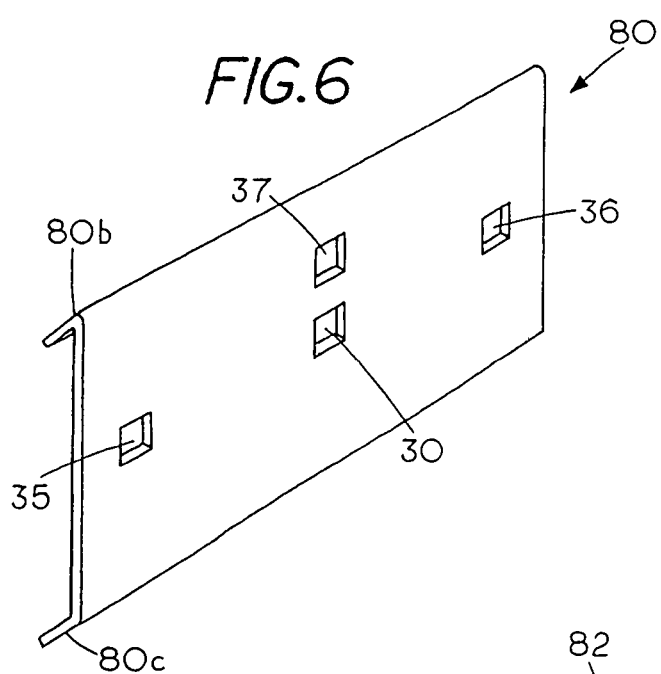
FIG. 6 is a perspective of an alternate embodiment of a three-point hitch faceplate.

FIG. 6 is a perspective of an alternate embodiment of a three-point hitch faceplate 80 having multiple attachment points 35, 30, 36 and 37 to enable attachment of articles at any of a number of different attaching points. The rigid plate 80 has a triangular lip 80b and 80c for engaging with a skid steer attachment.

Figure 7:
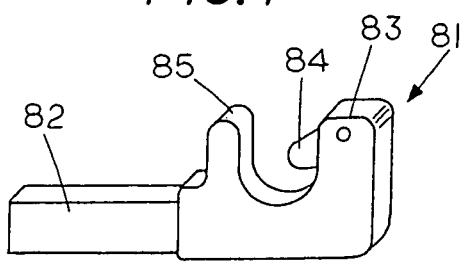
FIG. 7 is a perspective view of a hook for securing to the three-point hitch faceplate.

FIG. 7 is a perspective view of a hook 81 having an extension 82 for securing to the housing in the three-point hitch faceplate with the hook 81 including a first lip 85 with a second lip 83 spaced therefrom with a toggle 84 pivotally mounted to assist in retaining objects carried by hook 81.

Figure 7A:
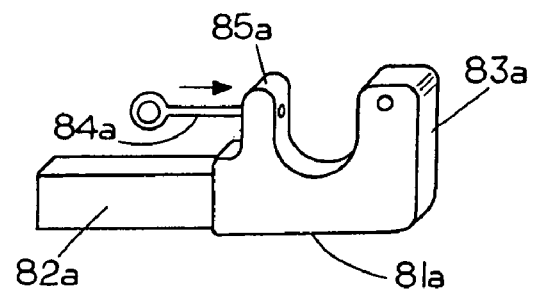
FIG. 7A is an alternate embodiment of a hook and an extension for securing to a housing in the three-point hitch faceplate.

FIG. 7A is an alternate embodiment of a hook 81a an extension 82a for securing to the housing in the three-point hitch faceplate with the hook 81a including a first lip 85a with a second lip 83a spaced therefrom with a pin 84a slideably mounted to assist in retaining objects carried by the hook.

Figure 8:
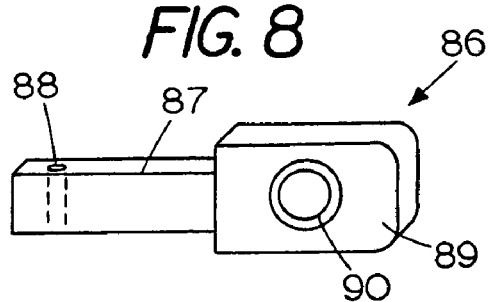
FIG. 8 is a perspective view of a loop type device for securing to the three-point hitch faceplate.

FIG. 8 is a perspective view of a loop type attachment device 86 for securing to the three-point hitch faceplate with the attachment device having a bar 89 having an extension 87 for engagement with the housing on the faceplate. An opening 88 extends through extension 86 to permit one to lock the attachment device 86 in position. Articles can be secured to bar 89 by passing through the opening 90 therein.

Figure 8A:
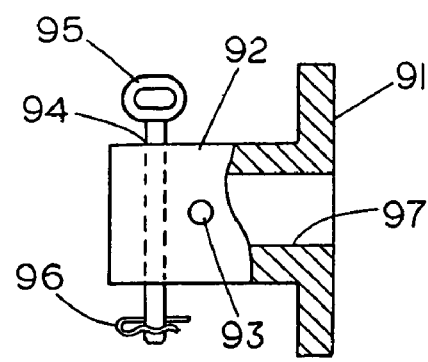
FIG. 8A is a partial side view showing the housing and pin for locking an attachment to the three-point hitch faceplate.

FIG. 8A is a partial side view showing the type of open box housing 92 on a three-point hitch faceplate 91 with the box housing having an opening 97 with a square cross section for receiving an extension from an attachment device. A first hole 93 extends through the housing 92 in one direction and a second hole 94 extends through the housing in a different direction and is shown with a pin 95 for locking an attachment extension to the three-point hitch faceplate with the pin 95 including a cotter pin 96 to maintain the pin 95 in the housing 92.

Figure 8B:
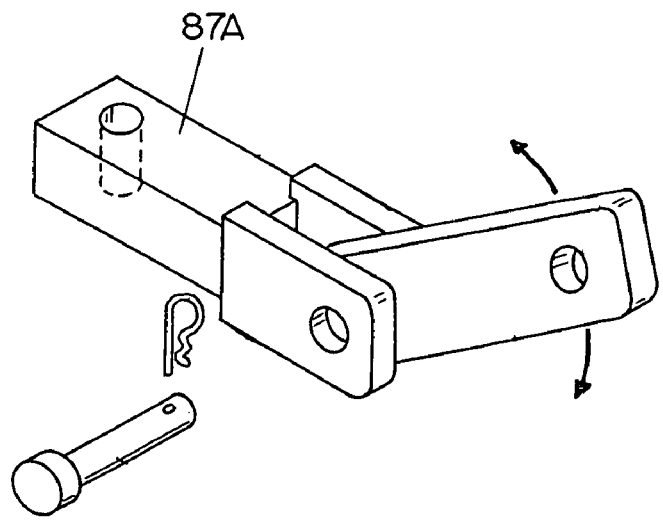
FIG. 8B is a perspective view of an alternate embodiment of a hitch.

FIG. 8B is a perspective view of an alternate embodiment of a hitch comprising an extension 87A.

Figure 9:
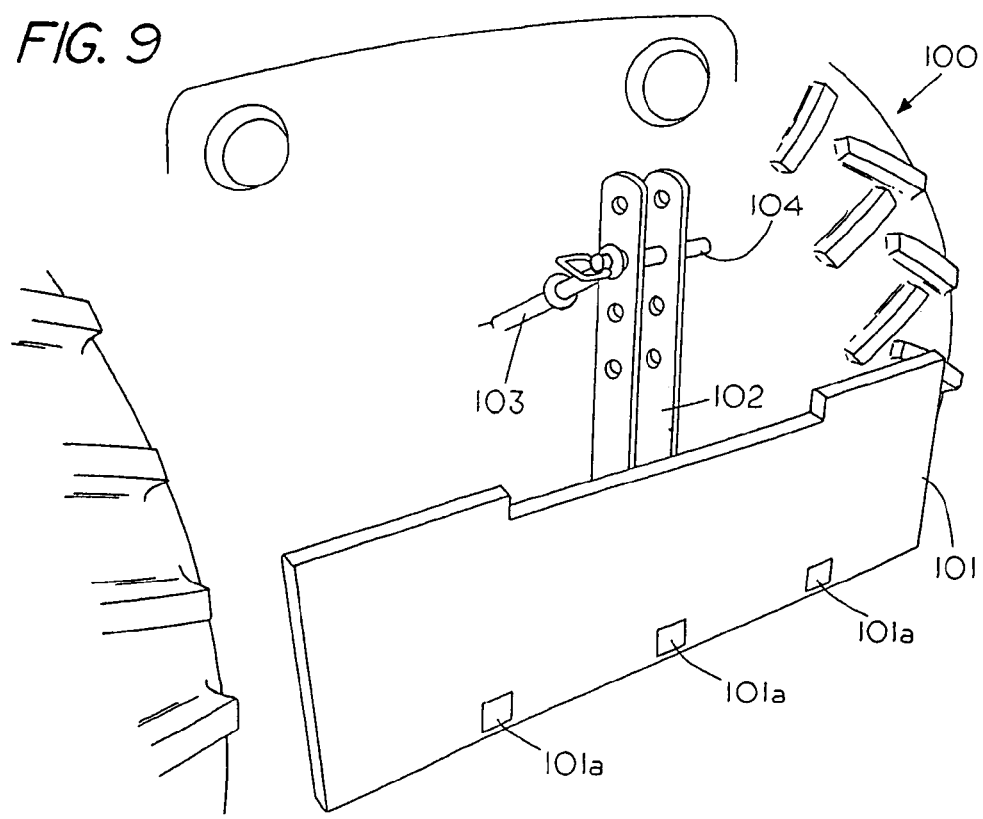
FIG. 9 is a perspective showing the three-point hitch faceplate mounted to the three-point hitch of a tractor.

FIG. 9 is a perspective showing a portion of the rear of an agricultural tractor 100 with the three-point hitch faceplate 101 mounted to the three-point hitch of a tractor through a set of upward extending bars 102 that are pinned to a connector 103 that attaches on one end to the three-point hitch of the tractor and on the other end to the arms 102 through a pin 104 that extends through the bars 102. The faceplate 101 is shown with a set of housings 101a located along the bottom of the faceplate 101.

Figure 10:
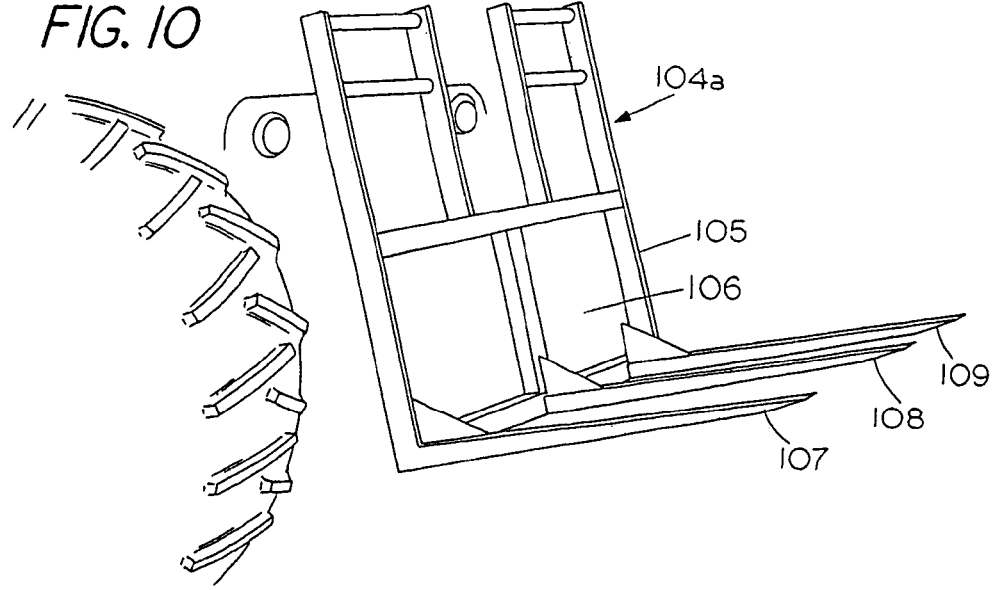
FIG. 10 is a perspective showing a pallet fork attached to the three-point hitch faceplate.

FIG. 10 is a perspective showing a fork lift 104a attached to the three-point hitch faceplate 106 with the fork lift having an upright member 105 and a set of three tines 107, 108 and 109 for lifting items including hay bales or the like.

FIG. 11 is a perspective showing a fork lift 110 mounted on tractor 100 with the fork lift having lateral positionable arms 111 and 112 which are secured directly to the three-point hitch faceplate 106 by frame 113.

FIG. 12 is a perspective showing a three-point hitch faceplate 113 having a first ball hitch 117 mounted thereon and a second ball hitch 116 mounted thereon. A further attachment 115 includes a hook 115a. Thus the embodiment of FIG. 12 provides for multiple attachment points with multiple types of attachment members.

Figure 13:
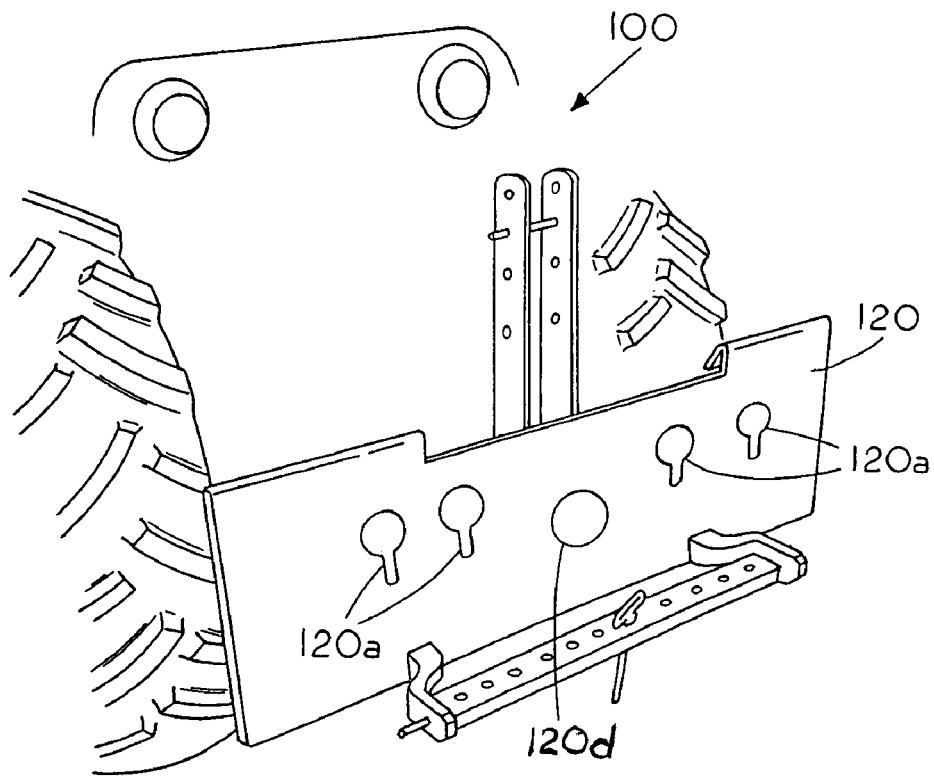
FIG. 13 shows an alternate embodiment of the three-point hitch faceplate with a set of slots for holding a chain therein.

FIG. 13 shows an alternate embodiment of the three-point hitch faceplate 120 mounted on tractor 100 with a set of keyhole slots 120a for holding a chain therein. A chain is placed through the large opening in the top and the links passed down into the lower portion of the keyhole slot to enable an adjacent link to engage the sides of the faceplate 120. An opening 120d permits insertion of a chain, cable or the like through faceplate 120. In order to provide for smooth passage therethrough a set of rollers could be positioned on the edge of the opening to allow passage therearound.

Figure 13A:
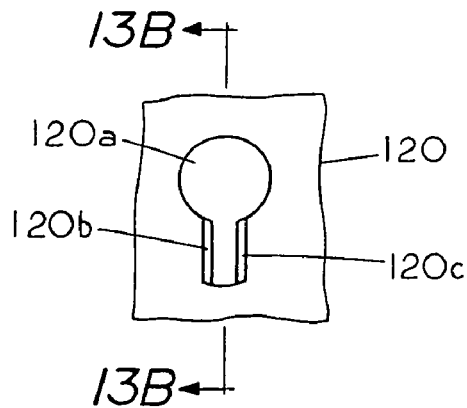
FIG. 13A shows a back view of a portion of the three-point hitch faceplate located around the chain lock.
Figure 13B:
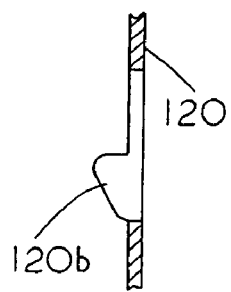
FIG. 13B shows a side view of the three-point hitch faceplate with the lips of the chain lock extending outward from the three-point hitch faceplate.

FIG. 13A shows a back view of a portion of the three-point hitch faceplate 120 located around the chain lock 120a with flanges 120b and 120c protruding outward from the elongated portion of the keyhole opening 120a. To appreciate the flanges, reference should be made to FIG. 13B which shows a side view of the three-point hitch faceplate with the lips or flanges 120b projecting outward from the backside of three-point hitch faceplate 120.

Figure 14:
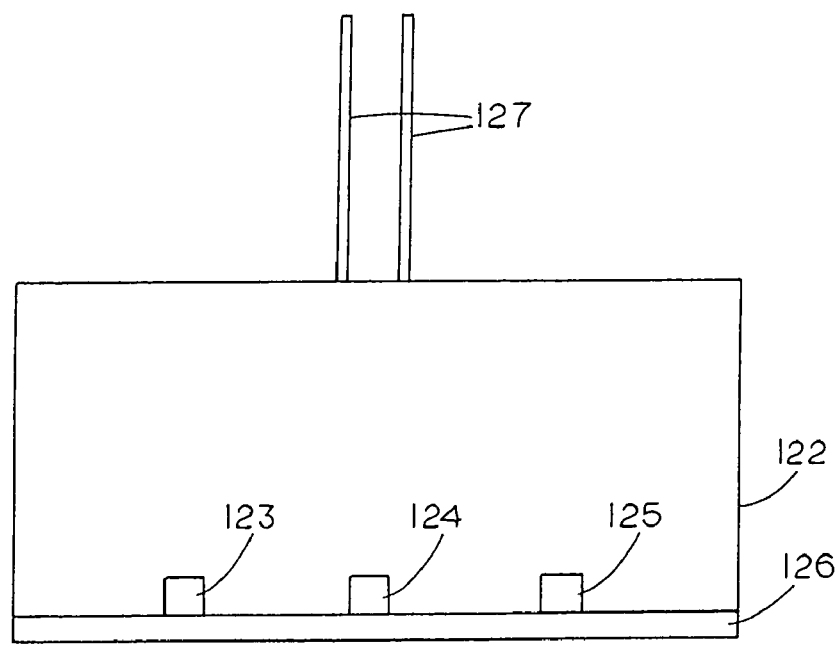
FIG. 14 shows a front view of the three-point hitch faceplate with three receiver hitch housing on the bottom of the unit for mounting attachments therein.

FIG. 14 shows a front view of the three-point hitch faceplate with three housing units 123, 124 and 125 on the bottom of the unit for mounting attachments therein and a hardened blade 126 extending along the bottom to permit the use of the faceplate as a leveling tool. A set of spaced apart extension arms extend upward from faceplate 122.

Figure 15:
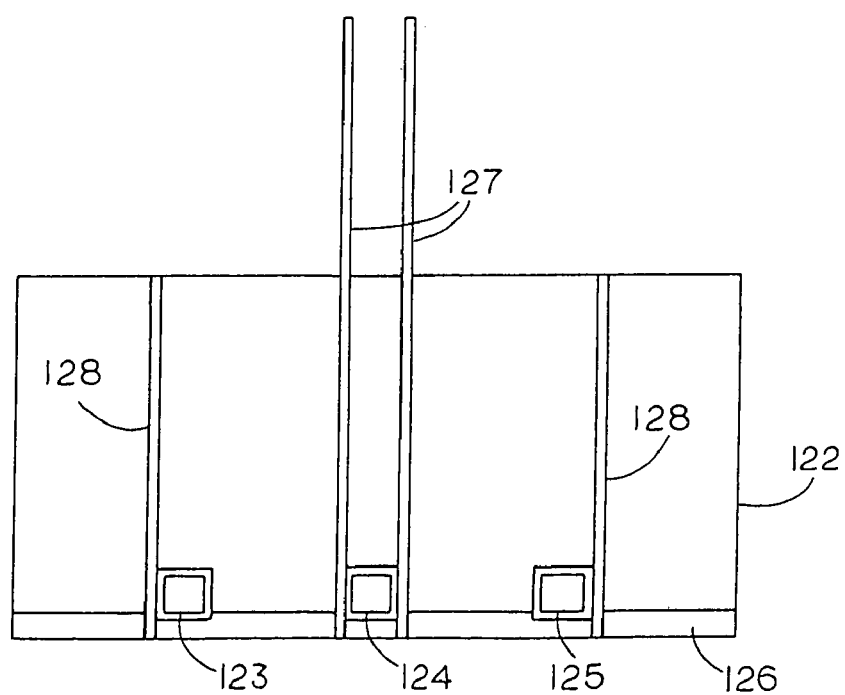
FIG. 15 shows a back view of the three-point hitch faceplate of FIG. 15.
Figure 16:
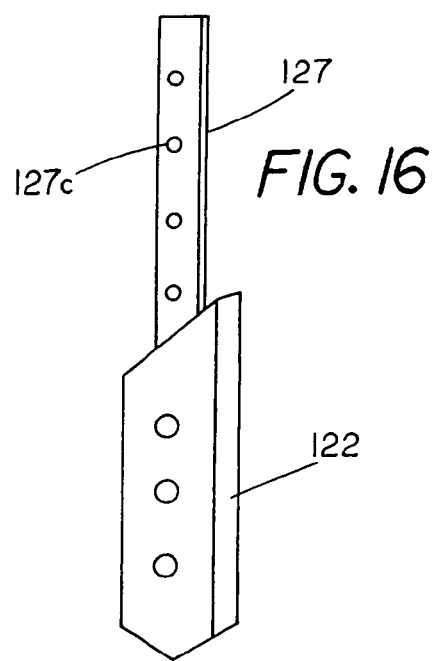
FIG. 16 shows a mechanical positionable arm for securing to the three-point hitch faceplate and the tractor.

FIG. 15 shows a back view of the three-point hitch faceplate 122 revealing stiffening members 127 and 128 extending transverse to the faceplate 122 as well as housings 123, 124, and 125. Located transversely to members 127 are lateral stiffing members and FIG. 16 shows a side view of three-point hitch faceplate 122 with the plurality of opening 127c therein to permit mounting of the faceplate to a variety of three-point tractor hitches.

Figure 17:
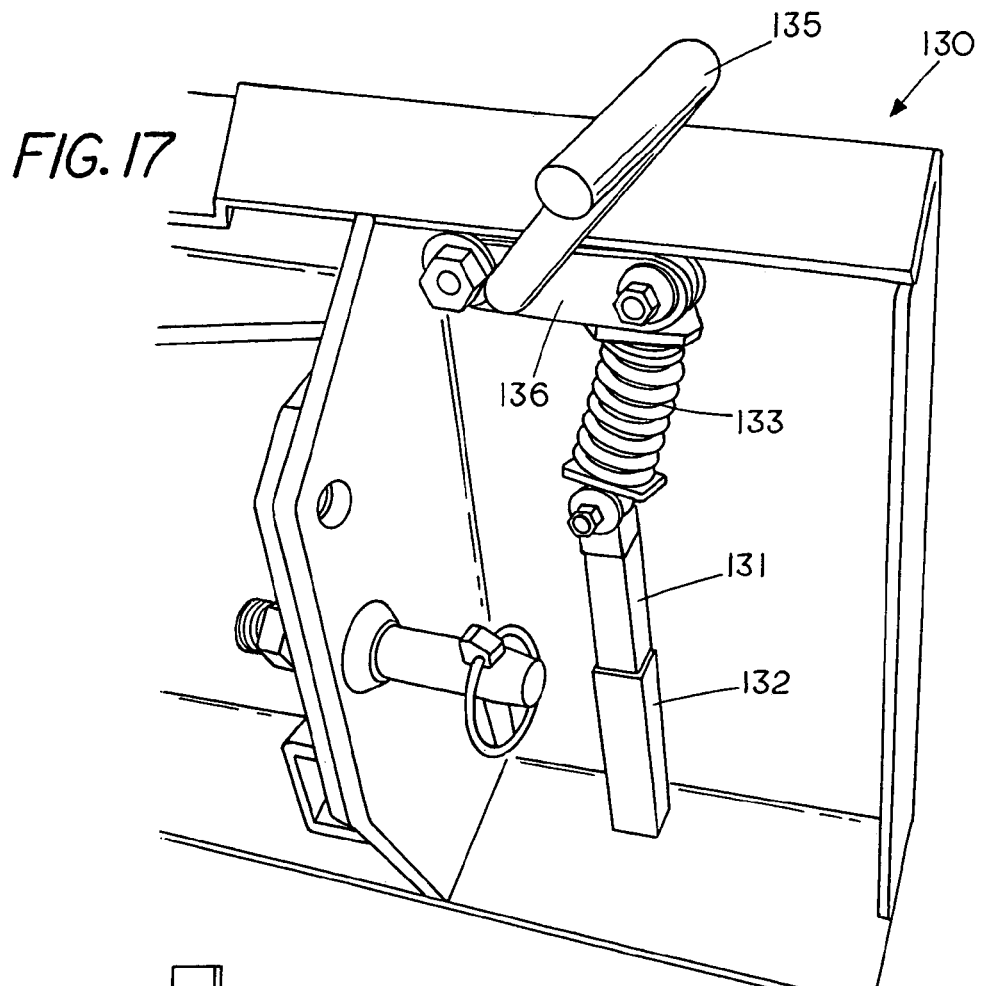
FIG. 17 shows a locking device for locking an attachment to the three-point hitch faceplate in the unlocked condition.

FIG. 17 shows a locking device 130 for locking a skid steer attachment to the three-point hitch faceplate in the unlocked condition. The mechanism includes a member 131 that slidingly extends in housing 132 and can be retracted or extended therein by partial rotation of handle 135 which rotates link 136 to compress spring 133 and force member 131 downward and through housing 132.

Figure 18:
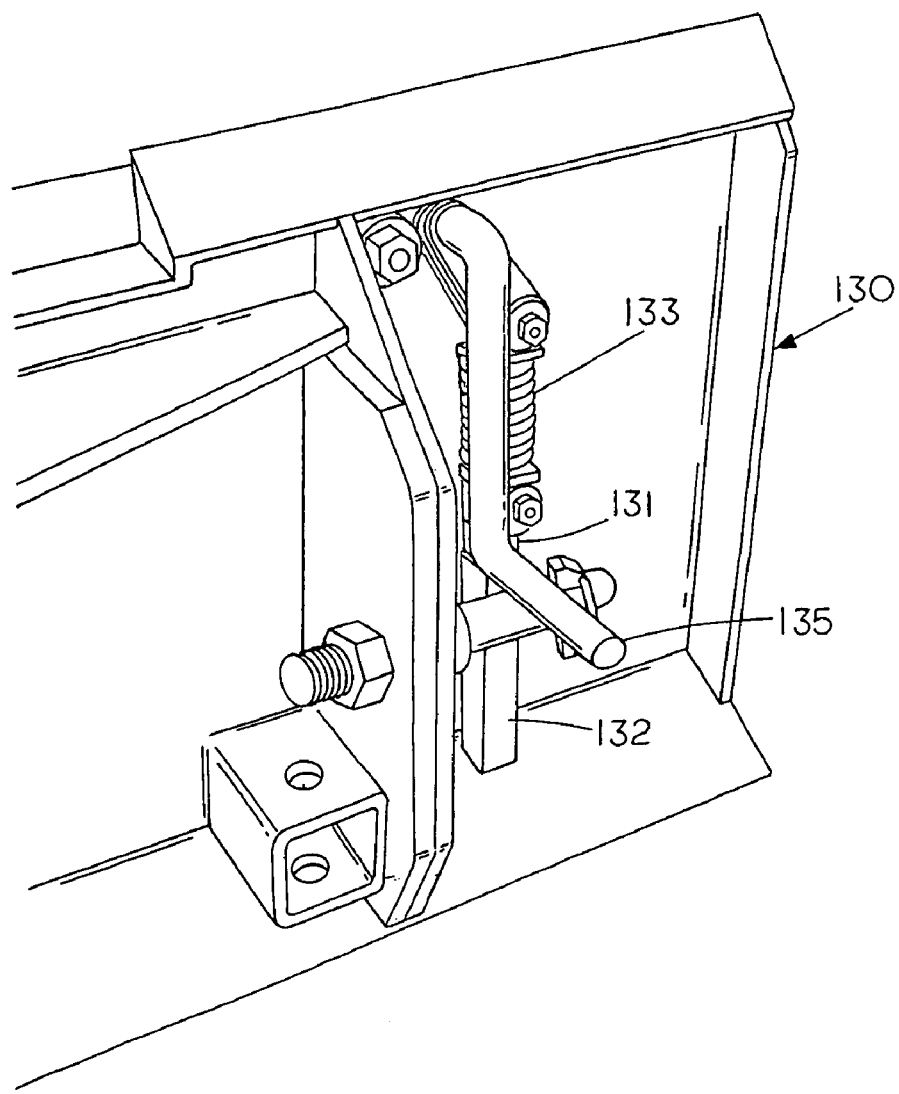
FIG. 18 shows the locking device of FIG. 17 in a locked condition to secure an attachment to the three-point hitch faceplate.

FIG. 18 shows the locking device of FIG. 17 in a locked condition to secure an attachment to the three-point hitch faceplate. In the locked condition the member 131 is extended into housing 132 which cause the member 131 to extend outward of the bottom of the faceplate (not shown) as the lever 135 is rotated clockwise to compress spring 133.

The use of locking mechanism on both side of the faceplate holds the bottom of the skid steer attachment securely against the three-point hitch faceplate and keeps the attachment from slipping at the bottom and also keeps the top of the attachment against a top retainer bar located on top of the three-point hitch faceplate. The lever operated mechanism is hingedly attached to the three-point hitch faceplate on the top to permit engagement or disengagement of an attachment to the three-point hitch faceplate. As an alternate embodiment one could have an extension to permit an operator to lock or unlock the mechanism from the seat of the tractor. Also a hydraulic or relay type mechanism could be used to lock or unlock a skid steer attachment to the three-point hitch faceplate.

While the three-point hitch faceplate has been described secured to the three-point hitch of a tractor the, three-point hitch faceplate could be also secured to a front end loader and could also be configured to other vehicles such as truck, car, four wheel or other utility vehicle.

Figure 19:
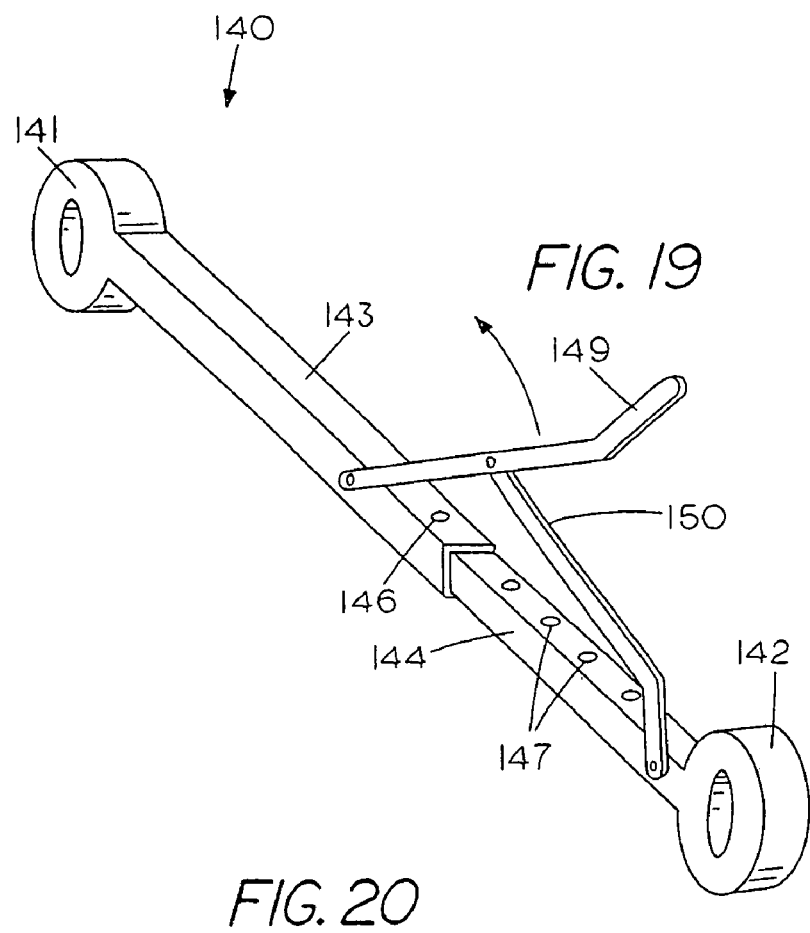
FIG. 19 is a perspective view of a mechanically adjustable top link for securing to the three-point hitch on the tractor and the three-point hitch faceplate.

FIG. 19 is a perspective view of a mechanically adjustable link 140 having a first end 141 and a second end 142 each having an eye therein. Located intermediate is a first member 143 that slides over bar 144 and can be locked in position through hole 146 in member 143 and holes 147 in member 144. A lever arm 149 with a link 150 permits one to extend or retract members 143 and 144 with respect to each other. The mechanical link is suitable for securing to the top link of three-point hitch on the tractor and the three-point hitch faceplate.

Figure 20:
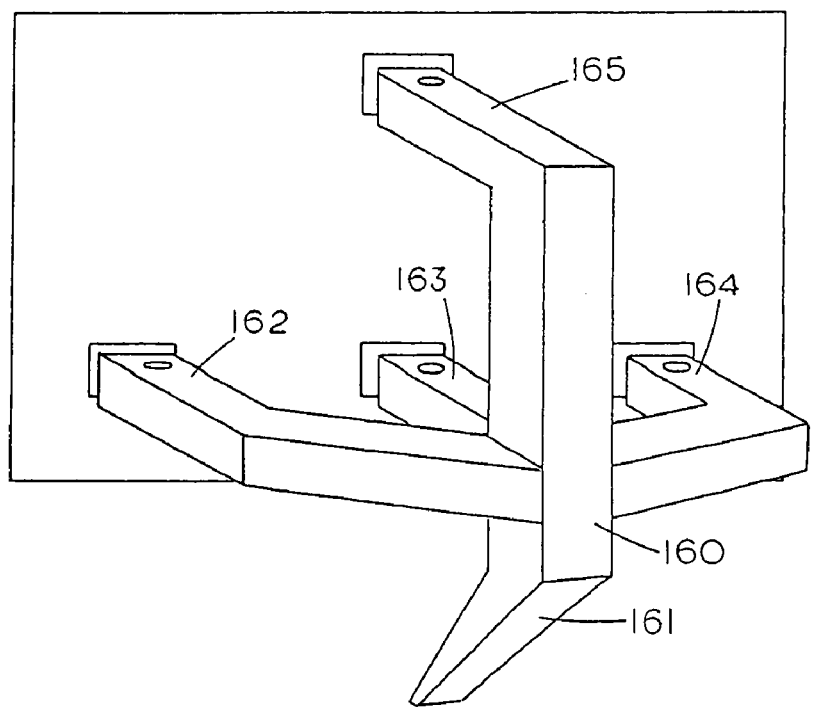
FIG. 20 is a perspective of a tool for tearing a soil furrow for attachment to a three-point hitch faceplate.

FIG. 20 is a perspective view of a furrow device 160 having a top member 165 for engaging a housing member in a faceplate, and three lower member 162, 163 and 164 for engaging lower housing in the three-point hitch faceplate. A tine 161 extends downward at an angle to the horizontal to enable one to tear up the soil as the furrow device is pulled forward.

Figure 21:
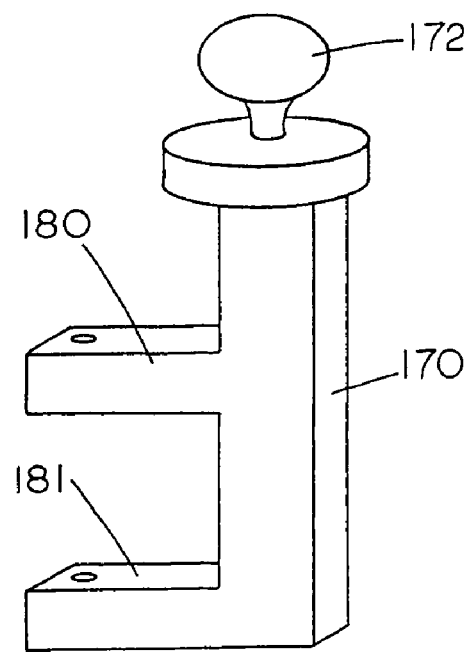
FIG. 21 is a perspective of a fifth wheel attachment for a three-point hitch faceplate.

FIG. 21 is a perspective view of a fifth wheel attachment 170 for mounting on a three-point hitch faceplate with the fifth wheel attachment having the top member 172 supported by extensions 180 and 181 that extend into housing on the three-point hitch faceplate of the present invention.

Figure 22:
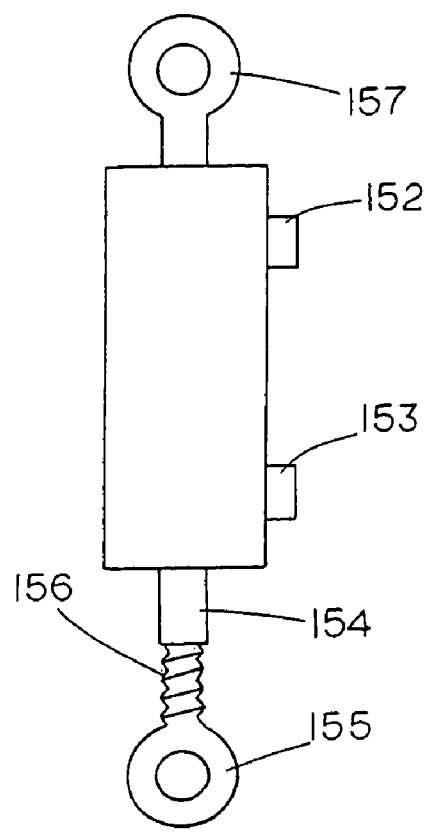
FIG. 22 is a front view of a top link having both hydraulic and mechanical extension.

FIG. 22 is a perspective view of an alternate embodiment of a top link 150 for use with the present invention. Top link 150 includes a two way hydraulic cylinder having hydraulic ports 152 and 153. Located at one end of link 150 is a swivelable eye 157 and located at the other end is an extension rod 154 having a female thread for receiving the male thread 156 formed on the shaft of swivelable eye 155. The rotation of eye 155 provides for the static lengthening or shorting of the link 150 while the hydraulic ports provide means for on-the-go extension and contraction of the top linkage 150.

A feature of the present invention is that the three-point hitch faceplate can be used with a number of different receiver style attachments including but not limited to trailer hitch, draw bar, bale forks, pallet forks, ground ripper, lift boom, tool box, utility box, three-point auxiliary hitch, winch and wood splitter.

FIG. 23 is a partial section exploded view of an extendible link 150 that includes multiple mechanical adjustments including rotational adjustment and linear extension adjustment. Link 150 includes a swivelable eye 151 that connects to housing 152 that contains female threads 152a that allow one to rotationally fasten housing 152 to male threaded member 153 that extends from member 154. Member 154 slidingly fits in and engages an outer housing enabling one to place pin 156 into any of holes 155 in order to lock the link 150 at a selected length. Similarly, a male threaded member 158 having a swivelable eye 157 forms threaded engagement with a threaded recess (not shown) in housing 159.

FIG. 24 shows a perspective view of a three-point hitch faceplate frame 180 for connecting to a three-point hitch and to a faceplate 185 of the present invention. Frame 180 includes a top opening 182 for connecting to the top link of the tractor three-point hitch and bottom shafts 183 and 184 for pivotally connecting to the lower members of the tractor three-point hitch. The faceplate 185 includes a first connecting member 185a located proximal a first end of the faceplate 185 and a second mounting member 185b located proximal the opposite end of the faceplate 185. The faceplate 185 is pivotable mounted at the first connecting member 185a by shaft 189 and at the second mounting member 185b by shaft 190. A hydraulic cylinder 186 having one end 187 connected to the frame 181 and a second end 188 connected to the faceplate 185 allows one to pivot the faceplate 185 through hydraulic cylinder controls (not shown). The incorporation of the frame with a hydraulic link 186 allows one to include the tilt feature of the faceplate in a separate frame rather than as part of a separate top link between the faceplate and the top member of the tractor three-point hitch.

FIG. 25 shows a side view of an alternate embodiment 180 of a frame having separate means for tilting the faceplate 169. Frame 160 includes a rigid member 161 having a lower pivot connection 171 on one end and an upper pivot connection 168 on the opposite end. A link 162 has one end that pivotally connects to link 163 through a pivot pin 167 and the other end that pivotally connects to member 161 through pivot pin 168.

Figure 26:
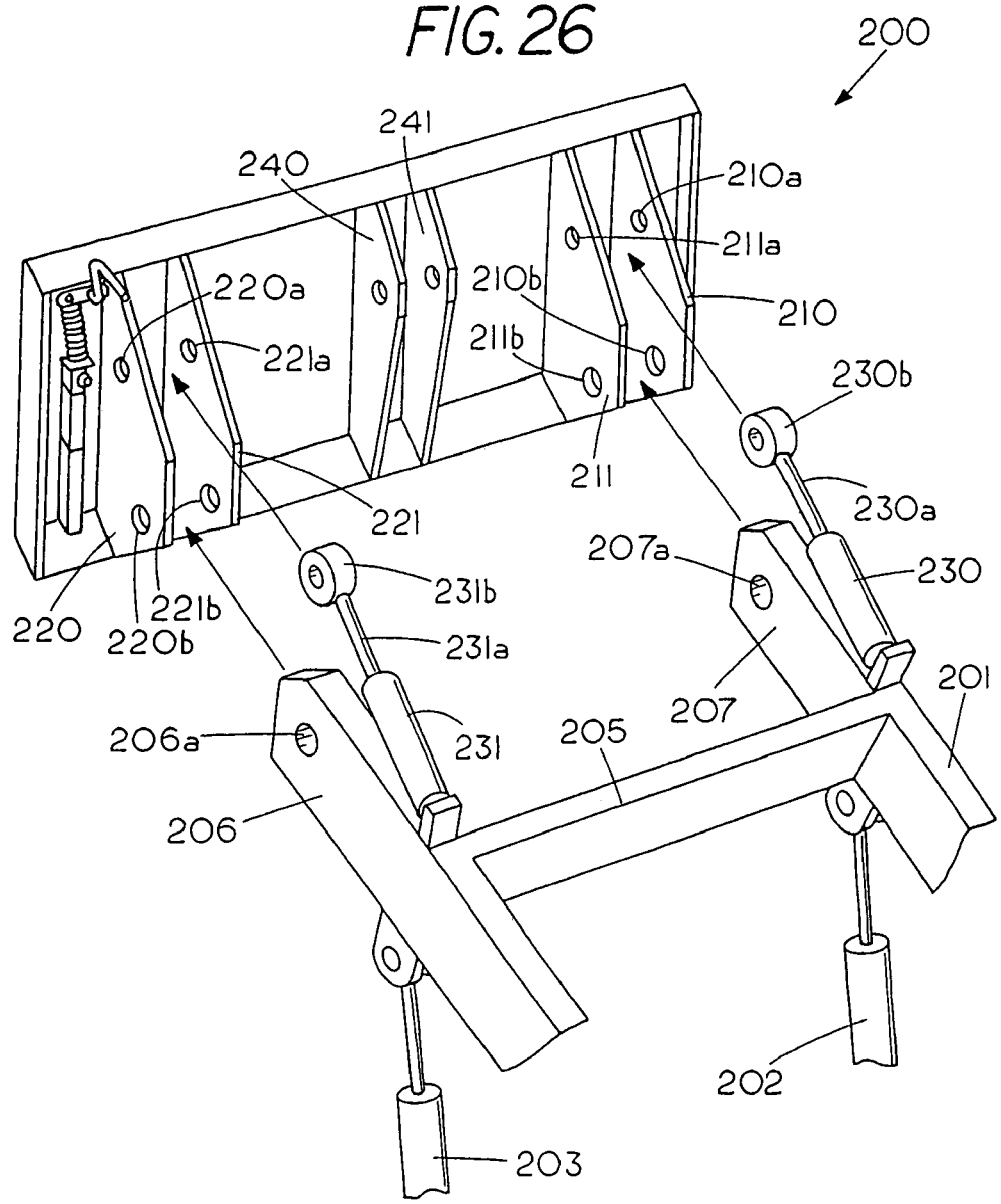
FIG. 26 is a perspective view of a faceplate for attachment to the front end of tractor loader.

FIG. 26 shows a partial perspective view of an alternate embodiment of my three-point hitch faceplate for use on either the front end of a tractor loader or on a three-point hitch of a tractor. Faceplate 200 includes a set of vertical flanges 220, 221, 210 and 211. Flange 210 has a set of openings 210a and 210b and flange 211 has a set of laterally aligned 10, openings 211a and 211b. Similarly, flange 221 has a set of openings 221a and 221b and flange 220 has a set of laterally aligned openings 220a and 220b.

A portion of the front end loader 201 is shown with a hydraulic cylinder 202 and a hydraulic cylinder 203 for lifting and lower front end loader 201. Located on one side of loader 201 is an extension 207 having an opening 207a that can be aligned with openings 210b and 211b to enable a pivot pin (not shown) to be extended therethrough. Similarly, on the other side of loader 201 is an extension 206 having an opening 206a that can be aligned with openings 220b and 221b to enable a pivot pin (not shown) to be extended therethrough. A cross member 205 separates and holds extensions 206 and 207 in position. The pivotal connections of extensions to the faceplate 200 allows faceplate 200 to pivot with respect to an axis through the openings 206a in the arm 206 and the opening 207a in arm 207.

Located on top of extension 207 is a first two way hydraulic cylinder 230 having an extension arm 230a and an eye end 230b for alignment with the opening 210a and 211a to enable a pivot pin (not shown) to be extended therethrough to form a pivoting connection to the faceplate flanges. Similarly, located on top of extension 206 is a two way hydraulic cylinder 231 having an extension arm 231a and an eye end 231b for alignment with the opening 220a and 221a to enable a pivot pin (not shown) to be extended therethrough to form a pivoting connection to the faceplate flanges. This feature allows my faceplate to be pivotally attached to the front end of a tractor. loader.

A central flange 240 and 241 are included to enable one to use a tractor loader with a single hydraulic cylinder in instead of the two lateral cylinders 230 and 231. In addition, one can mount the three-point hitch face plate 200 on the three-point hitch of a tractor using the central flanges 240 and 241. Thus a feature of the embodiment of FIG. 26 is that the faceplate 200 is a universal faceplate that can be mounted on either the front or rear of a tractor.

I claim:

1. A three-point hitch faceplate comprising:
   a planar rigid member, said planar rigid member having a front side and a back side;
   a housing on said planar rigid member for receiving an attachment, said housing comprising a plurality of box housings for mounting a trailer hitch in different locations on said planar rigid member;
   a first connecting member secured to the back side of said planar rigid member;
   a second connecting member secured to the back side of said planar rigid member, said second connecting member laterally positioned with respect to said first connecting member, said first connecting member connectable to a first tractor mount and said second connecting member connectable to a second tractor mount;
   a third connecting member secured to the back side of said planar rigid member, said third connecting member spaced from a straight line connecting said first connecting member and said second connecting member to thereby form a three-point hitch; and
   a two way hydraulic cylinder said hydraulic cylinder extendible and contractable said two way hydraulic cylinder having a first end for connecting to a third tractor mount and a second end, said second end pivotally connected to said third connecting member to thereby form an extendible link between the third tractor mount and the third connecting member to allow a user to position the planar rigid member in an attaching condition.

2. A three-point hitch faceplate comprising:
   a rigid member, said rigid member having a front side and a back side;
   a plurality of box housings for mounting a trailer hitch in different locations on the rigid member;

a first connecting member secured to the back side of said planar rigid member;

a second connecting member secured to the back side of said planar rigid member, said second connecting member laterally positioned with respect to said first connecting member, said first connecting member connectable to a first tractor mount and said second connecting member connectable to a second tractor mount;

a third connecting member secured to the back side of said rigid member, said third connecting member spaced from a straight line connecting said first connecting member and said second connecting member to thereby form a three-point hitch; and a two way hydraulic cylinder, said hydraulic cylinder extendible and contractable said two way hydraulic cylinder having a first end for connecting to a third tractor mount and a second end, said second end pivotally connected to said third connecting member to thereby form an extendible link between the third tractor mount and the third connecting member to allow a user to position the rigid member in an attaching condition.

3. The three-point hitch faceplate of claim 2 including a drawbar having a first end for mounting in a one of the plurality of box housings and a second end for mounting in another of the plurality of the box housings.

4. The three-point hitch faceplate of claim 1 wherein the two way hydraulic cylinder is mounted proximate a top lip of the rigid member.

5. The three-point hitch faceplate of claim 1 wherein the rigid member has an angular lip for engaging with a skid steer attachment.

6. The three-point hitch faceplate of claim 1 wherein the front of the rigid member includes a keyhole opening for extension of a link therethrough for securing the link to the rigid member.

7. A method of operating a skid steer attachment comprising the steps of:

securing a three-point hitch faceplate to a three-point hitch of an agricultural tractor;

positioning the three-point hitch faceplate in an engagement with a skid steer attachment;

securing the skid steer attachment to the three-point hitch faceplate by hooking a lip of the three-point hitch faceplate and extending connecting links through a set of openings in the three-point hitch faceplate;

extending pins through the connecting links to hold the skid steer attachment in position on the faceplate; and using the agricultural tractor to operate the skid steer attachment.

8. A method of operating a skid steer attachment comprising the steps of:

securing a three-point hitch faceplate to a three-point hitch of an agricultural tractor;

positioning the three-point hitch faceplate in an engagement with a skid steer attachment;

securing the skid steer attachment to the three-point hitch faceplate; and mounting a ball hitch in the three-point hitch faceplate to allow the tractor to be used to tow a vehicle.

9. A method of operating a skid steer attachment comprising the steps of:

securing a three-point hitch faceplate to a three-point hitch of an agricultural tractor;

positioning the three-point hitch faceplate in an engagement with a skid steer attachment;

securing the skid steer attachment to the three-point hitch faceplate;

mounting a drawbar to the three-point hitch faceplate; and using the agricultural tractor to operate the skid steer attachment.

10. The method of claim 9 wherein the drawbar is welded to the three-point hitch faceplate.

11. The method of claim 9 wherein the drawbar is pinned to the three-point hitch faceplate by pins extending through a portion of the drawbar and a set of spaced apart box housings in the faceplate.

12. A three-point hitch faceplate comprising:

a rigid member, said rigid member having a front side and a back side, said rigid member including multiple rows of housings thereon to permit attachment members thereto in different positions;

a first connecting member secured to the back side of said rigid member;

a second connecting member secured to the back side of said rigid member, said second connecting member laterally positioned with respect to said first connecting member, said first connecting member connectable to a first tractor mount and said second connecting member connectable to a second tractor mount; and a third connecting member secured to said rigid member, said third connecting member spaced from a straight line connecting said first connecting member and said second connecting member to thereby form a connection with a third tractor mount.

13. The three-point hitch faceplate of claim 12 wherein at least one of said multiple rows of housings of said rigid member comprises a housing for securing a skid steer attachment thereto.

14. The three-point hitch faceplate of claim 12 wherein a bale fork is mounted on said three-point hitch faceplate.

15. The three-point hitch faceplate of claim 12 wherein at least one of said multiple rows of housings of said rigid member comprises a box housing with a trailer hitch secured therein.

16. The three-point hitch faceplate of claim 12 where the faceplate includes a keyhole slot for temporarily securing a chain thereon.

17. The three-point hitch faceplate of claim 12 includes a locking mechanism for securing a skid steer attachment to the three-point hitch faceplate.

18. The three-point hitch faceplate of claim 12 including a mechanically adjustable link for engaging the three-point hitch faceplate and at least one of the tractor mounts.

19. The three-point hitch faceplate of claim 12 including mounting member for securing the three-point hitch faceplate to either the front or rear of a tractor.

20. The three-point hitch faceplate of claim 12 including a mechanical extendible link having rotational adjustment and linear extension.

21. The three-point hitch faceplate of claim 12 including a three-point hitch frame having a hydraulic cylinder thereon for tilting the three-point hitch face plate with respect to the three-point hitch frame.

* * * * *